Patented Nov. 3, 1931

1,830,294

UNITED STATES PATENT OFFICE

JEAN BAPTISTE SALARNIER, OF CREPIEUX-LA-PAPE, FRANCE

CONTAINER AND DISTRIBUTOR FOR PULVERULENT SUBSTANCES, MORE PARTICULARLY APPLICABLE FOR FACE-POWDER

Application filed September 3, 1930, Serial No. 479,550, and in France September 6, 1929.

This invention relates to improvements in containers and distributors for pulverulent substances more particularly applicable for face-powder.

The distributor apparatus is provided with fixed sieve for pulverulent bodies and more especially for face-powder which fulfill the conditions essential to all sifting operations, that is to say; thrust of the substance against the sieve and relative displacement of the one with regard to the other.

The distributor apparatus is essentially characterized in that it is given an alternating reciprocating movement consisting in two concomitant displacements, one of them ascendant which applies the pulverulent substance against the sieve and the other lateral or gyral which displaces this substance in a plane parallel with that of the sieve in order to assist its passage through the latter.

It can be understood that at each movement a certain quantity of pulverulent substance, rice powder for instance, is passed through the sieve, which can then be taken up on a powder-puff.

A particular feature of the device is that, when the movable base is in its lowest position and if there is too much powder on the sieve, the excess powder can be again passed through the sieve, to the inside of the device.

The invention also comprises various constructions of the device wherein the movable base is connected to the periphery of the sieve by a flexible membrane of suitable material (skin, cloth, rubberized cloth, rubber, flexible or jointed metal, etc.), the movable base being mounted on single or double joints, and its movement being produced from the outside of the box in which the mechanism is arranged by any suitable means such as spring or other plungers, levers, inclines, or the like.

The annexed drawings illustrate examples of construction of the invention in which.

Assuming the device is to be used for rice powder it can be constructed as follows or in like manner.

Figure 1:
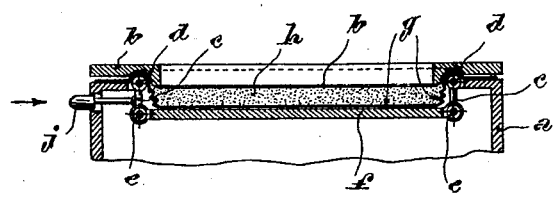
Figs. 1 and 2 are two cross-sections showing the distributor mechanism respectively in its two extreme working positions.

The fixed portion of the distributor mechanism which can be placed inside any suitable box, comprises essentially a support $a$ of the sieve $b$;

The movable part comprises (Figs. 1 and 2) hinges or links $c$ articulated at $d$ on the aforesaid support $a$, and at $e$ on a rigid movable base $f$. A flexible membrane $g$ of suitable material, skin for example, forms the reservoir of the pulverulent substance $h$ between the said base $f$ and the sieve $b$.

Figure 2:
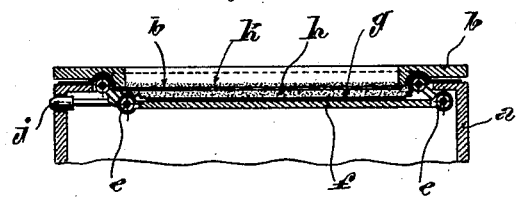

This base $f$ can be displaced as shown in Figure 2, by any suitable means for example by a simple plunger $j$ articulated on one of the hinges or links $c$ and operated from the outside itself of the box.

The movable base $f$ can be restored to its low position (Fig. 1) either by the force of gravity under the action of its own weight, or by the action of a spring.

The operation of such mechanism is easy to understand.

At each pressure of the finger, in the direction of the arrow, on the head of the plunger $j$, the movable base $f$ which is articulated on the support $a$, takes the position shown in Figure 2, that is to say, applies the pulverulent substance $h$, such as rice powder, against the sieve $b$, whilst causing it to slide against the latter.

Consequently at each operation a certain amount $k$ Fig. 2 of the pulverulent substance passes through the sieve $b$, which amount can be regulated at will, accordingly as a greater or less number of successive actions of the finger are effected on the head of the plunger $j$.

Should this amount $k$ of powder be too great, the excess portion can be caused to pass back through the sieve by simple friction of the powder-puff or other device since the reserve of powder contained inside the distributor is no longer in contact with the sieve.

Figure 3:
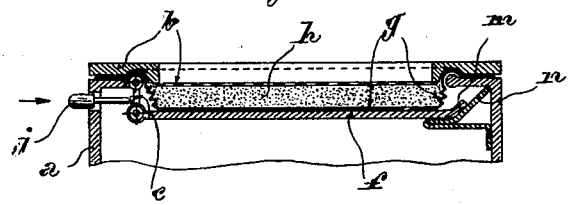
Figs. 3 to 5 illustrate modifications of construction.

In the modification of construction illustrated in Figure 3 one of the hinges is omitted and replaced by an incline $n$ of suitable slope on which the turned up end $m$ of the movable base $f$ bears and slides when the plunger $j$ is pushed in.

Figure 4:
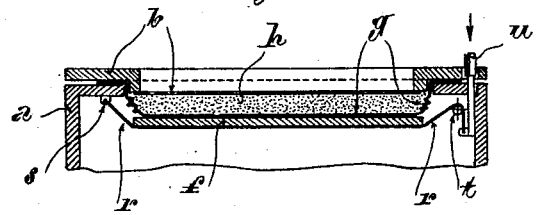

In the modification shown in Figure 4, the articulation of the movable base $f$ is formed by a strip of fabric $r$ or other flexible material, one of the ends of which is fastened at $s$ to the body of the box $a$, while the other is passed over a spindle $t$ and is connected to the end of a plunger $u$ of suitable form.

Figure 5:
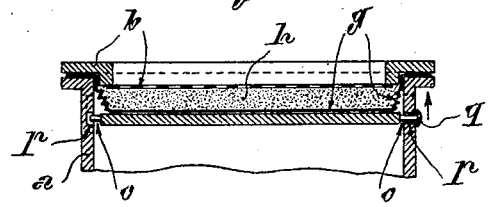

In the construction shown in Fig. 5 the whole of the aforesaid mechanism constituting a distortable parallelogram is replaced, by a movable base $f$ which can rise parallel to itself, while moving nearer to the sieve $b$, under the action of two pins $o$ engaged in inclines $p$. One of these pins is provided with an operating button and operatable from outside.

The invention is not limited to the forms of construction described but embraces all variations of construction wherein the pulverulent substance inside a distortable membrane forming a bellows and resting on a movable base is contained.

Having now particularly described and ascertained the nature of my said invention and in what manner the same is to be performed, I declare that what I claim is:

1. A distributor for pulverulent substances, more particularly applicable to boxes for face-powder, characterized by mechanism having an alternating reciprocating movement which applies the pulverulent substance against a sieve, and also having a lateral reciprocatory movement, which displaces the pulverulent substances in a plane parallel with that of the sieve to assist its passage through the latter, the movable base being returned after each operation to its normal position remote from the sieve.

2. A distributor as in claim 1 in which the movable base is connected to the periphery of the sieve by a flexible membrane of suitable material the movable base being mounted on single or double articulations, the movement of said base being produced by suitable mechanism operated by a plunger or the like actuated from outside a box in which the distribution mechanism is arranged.

3. A distributor for pulverulent material, comprising a sieve, a base, and means to move the base toward and from the sieve and also laterally alternately in opposite directions, so that pulverulent material between the sieve and the base is forced by the base through the sieve and is also moved laterally and hence correspondingly distributed in proximity to and also in contact with the inner side of the sieve, so that the forcing of such material through the sieve is facilitated.

4. A distributor as claimed in claim 3, including a container made of flexible material, arranged between the base and the sieve and open on the side next the sieve.

In witness whereof I affix my signature.

JEAN BAPTISTE SALARNIER.